3,743,612
PROCESS FOR CURING CARBOXYLATED LATEX WITH A COREACTIVE RESIN USING TETRA-AMMINEZINC (II) SALTS
Theodore Merriam Vial, Princeton Township, Mercer County, N.J., assignor to American Cyanamid Company, Stamford, Conn.
No Drawing. Continuation-in-part of application Ser. No. 155,308, June 21, 1971. This application June 14, 1972, Ser. No. 262,806
Int. Cl. C08j 1/16, 1/18
U.S. Cl. 260—2.5 L
9 Claims

ABSTRACT OF THE DISCLOSURE

A carboxylated latex pre-vulcanizate composition is provided which comprises:

(a) a carboxylated latex which is a copolymer of at least two polymerizable, ethylenically unsaturated monomers selected from the group consisting of butadiene, styrene, acrylonitrile and monomers copolymerizable therewith wherein up to about 10 percent by weight of said monomers consists of monomers which have a pendant reactive group, selected from the group consisting of monoethylenically unsaturated mono- and dicarboxylic acids, acrylamide, an N-hydroxyalkylacrylamide or a primary hydroxyalkyl acrylate, (b) from about 1 to 100 percent, based on the weight of the copolymer in the latex, of at least one coreactive resin being selected from the group consisting of melamine-formaldehyde condensates, urea, urea-formaldehyde condensates, methylated melamine-formaldehyde condensates, methylated urea-formaldehydrate condensates, butylated melamine-formaldehyde condensates, butylated urea-formaldehyde condensates and phenol formaldehyde condensates, and (c) from about 0.5 to 5 percent based, on the weight of the solids content of the latex and the resin together, of a tetraamminezinc (II salt).

In addition, solid foams prepared from the above composition, as well as composite articles comprising such foams are also provided along with a method of preparing such solid foams.

CROSS REFERENCE TO RELATED APPLICATIONS

This application is a continuation-in-part of U.S. application Ser. No. 155,308, filed June 21, 1971 now abandoned.

Generally stated, the present invention relates to a carboxylated latex pre-vulcanizate composition. More particularly, the invention relates to a pre-vulcanizate composition comprising a carboxylated latex, a coreactive resin and a tetraamminezinc (II) salt to catalyze the reaction between the latex and the resin.

BACKGROUND OF THE INVENTION

Carboxylated latex has found wide use in such applications as non-woven fabrics, pigment binders for paper, backing for upholstery and carpets. Thse carboxylated latices are often used in these applications without added curatives or vulcanizing agents. They are often called "self-curing" latices in which the polarity provided by the carboxyl groups provides improved adhesion.

Latex foams are also being used in ever increasing amounts as rug backing and as padding and insulation in many apparel fabrics. Foams prepared from carboxylated latices and coreactive resins, such as melamine-formaldehyde resins, are applied to the surface of a substrate and cured to effect formation of a foam by the cross linking that occurs between the latex and the resin.

The process for employing such foams involves mixing a carboxylated latex with a coreactive resin, spreading it on a substrate with a doctor blade or "kiss" roll, or frothing the mixture and applying same to the surface of a substrate. The mixture is then gelled and cured at a temperature of about 150° C. to provide a composite structure comprising the foam and the substrate. A description of the latices and their use is given in a publication by Eilbeck and Urig, Rubber World, May 1963, pp. 38–42 and by Davis and Welch, Rubber World, May 1963, pp. 43–45.

Although the curing reaction may be conducted exclusively under the influence of heat, that is not desirable because of long reaction times and the thermal sensitivity of some of the substrates, such as the acrylic fibers and polyolefins. Therefore, it is desirable to use a catalyst to promote the cure and to complete same at as low a temperature and in as short a period of time as possible.

The catalysts which have been used heretofore were generally acidic materials or latent acids, such as amine hydrochlorides, ammonium chloride, and the like. Metal salts, such as $MgCl_2$, $ZnCl_2$, $ZnNO_3$ and the like, have also been used, but these are acidic in solution. While many of these catalysts do perform their intended function and have been found useful, they present problems in use. Thus, being acidic, they tend to coagulate the alkaline latex. Moreover, they are usually used as dilute ($<30\%$) solutions which tend to dilute the latex more than is desirable, since high solids content of the latex to provide "body" for frothing in foam use is generally essential. Also, it is desirable to limit the amount of water to be removed during drying.

Additional disadvantages are encountered in those carboxylated latex, coreactive resin compositions disclosed in U.S. Pat. 3,215,647 issued to E. R. Dunn on Nov. 2, 1965. In accordance with the disclosure of the patent, a latex is mixed with a suitable resin and a gelling agent; and the mixture is foamed, gelled and then cured. Many of the latices disclosed in the patent are alkaline in nature and even when a gelling agent such as sodium silicofluoride is added to the pre-vulcanizate, the addition of an acidic curing catalyst usually results in coagulating part of the latex, thereby causing small undesirable particles of coagulum to be present in the ultimate foamed structure.

The present invention represents the culmination of a series of investigations conducted largely by the inventor directed to improving the curing reaction of carboxylated latex, coreactive resin compositions.

Accordingly, it is an object of this invention to provide an alkaline catalyst for the curing of a reactive latex with a coreactive resin. It is a further object to provide a catalyst system which has a high concentration in solution and which can be added directly to a latex without coagulation and undue dilution.

It is yet another object to provide a method for making foams from a carboxylated latex coreactive resin composition without resorting to the use of high temperatures and long reaction times.

Additional objects and advantages will be set forth in part in the description which follows, and in part will be obvious from the description or may be learned by the practice of the invention, the objects and advantages being realized and attained by means of compositions and improvements, particularly pointed out in the appended claims.

THE INVENTION

To achieve the foregoing objects and in accordance with its purposes, as embodied and broadly described, the present invention provides a carboxylated latex prevulcanizate composition comprising a carboxylated latex which is a copolymer of at least 2 polymerizable, ethylenically unsaturated monomers selected from the group consisting of butadiene, styrene and acrylonitrile and monomers copolymerizable therewith wherein up to about 10 percent by weight of said monomers consists of monomers which have a pendant reactive group, selected from the group consisting of monoethylenically unsaturated mono- and dicarboxylic acids, acrylamide, an N-hydroxyalkylacrylamide or a primary hydroxyalkyl acrylate, and from about 1 to 100 percent, based on the weight of the copolymer in the latex, of at least one coreactive resin being selected from the group consisting of amineformaldehyde condensates, phenol-formaldehyde condensates, phenol-formaldehyde condensates, and urea-formaldehyde condensates and from about 0.5 to 5 percent, based on the weight of the solids content of the latex and the resin together, of a tetraamminezinc (II) salt. Latices of an alkyl acrylate and acrylic or methacrylic acid are also useful for the purposes of this invention.

The invention also relates to a process for preparing a solid foam from the above latex pre-vulcanizate composition, as well as a composite article composed of a substrate with an adherent coating of a solid foam prepared from the above composition.

The invention consists of the novel methods, processes, steps and improvements shown and described.

It is to be understood that both the foregoing general description and the following detailed description are exemplary and explanatory and are not restrictive of the invention.

To prepare the latices employed in the practice of this invention at least two polymerizable, ethylenically unsaturated monomers, of the class of butadiene, styrene and acrylonitrile and monomers copolymerizable therewith, are copolymerized in an emulsion system to form a latex copolymer which is film-forming below about 120° C., or can be made film-forming at that temperature by the addition of solvents or plasticizers.

At least one of such monomers which is copolymerized to form a latex for use in the instant invention consists of those polymerizable, ethylenically unsaturated monomers which have pendant reactive substituent groups such as a monoethylenically unsaturated mono- and dicarboxylic acids, acrylamide, an N-hydroxyalkylacrylamide, or a primary hydroxyalkyl acrylate.

Examples of such latices are: Copolymers of styrene, butadiene and acrylic (or methacrylic) acid, itaconic acid, acrylamide, N-hydroxyethylacrylamide, beta hydroxyethyl acrylate; copolymers of butadiene, acrylonitrile and acrylic acid, methacrylic acid, itaconic acid, acrylamide, N-hydroxy ethyl acrylamide, beta hydroxyethylacrylate, and the like.

The coreactive resins which are employed in this invention are those materials which are soluble in water or in water-miscible solvents or which are water dispersible. They contain at least one carbon atom and have at least two substituent groups coreactive with the reactive groups on the copolymer of the latex. There may be selected as the coreactive material for use with the reactive latex component other latices which contain polymers having a plurality of substituent groups which also are coreactive with the substituent groups on the copolymer of the reactive latex. Representative coreactive substituent groups are (a) methylol groups when attached to a nitrogen atom, (b) modified methylol groups which have been alkylated with an alcohol having from 1 to 4 carbon atoms when such groups are attached to a nitrogen atom and (c) methylol group when attached to the aromatic ring of a phenolic compound.

Examples of such coreactive resins are melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates and phenolformaldehyde condensates.

The reactive latex and the coreactive material are used in such amounts that the mixture contains the coreactive material in a quantity equal to from about 1 to about 100 percent of the weight of the copolymer comprising the latex. If the coreactive material is water-soluble, it may simply be mixed with the latex or the material may be added as an aqueous solution or as a solution in a water-miscible solvent. If the coreactive material is not appreciably soluble in water or a water-miscible solvent, then it is added as an aqueous emulsion. However, the emulsifiers used for the preparation of such emulsions, as well as the emulsifiers used in the manufacture of the latex, are selected so that they are compatible with one another and with the reactive groups on the latex polymer and with the reactive groups on the coreactive resin.

The tetraamminezinc (II) salt of this invention, then, is employed to catalyze the cure of the latex and the coreactive resin, and it is employed in a concentration of from about 0.5 to about 5 percent by weight of the solids content of the latex composition.

Such a mixture of the reactive latex and the coreactive resin may be applied directly to a substrate, such as the back of a carpet or upholstery material by methods well known in the art. Typical methods include roll-coating, knife-coating and spray-coating.

Such a mixture may also be foamed or frothed by the use of blowing agents by methods known in the art for foaming other known kinds of latex; for example, releasing a non-coagulating gas such as nitrogen, or by causing the decomposition of a gas-liberating material to chemically react with an ingredient in the mixture with the liberation of a non-coagulable gas as a reaction product. The mixture of the reactive latex and the coreactive material is also foamed by whipping or by use of apparatus having commercially available foam heads. Known foaming aids, such as sodium lauryl sulfate, or foam stibilizers, such as potassium oleate, may be added if desired. Preferably, such added materials should be non-reactive with the reactive group in the latex polymer or in the coreactive material and thus the preference may vary with the composition of the mixture. Other soaps, emulsifiers, wetting agents, surfactants, and the like, however, may be used even though they may be reactive to a limited extent. The volume of the mixture usually is increased from 5 to 12 times its original volume during the frothing step.

Although not required in the practice of this invention, known coagulating or destabilizing agents such as sodium silico-fluoride and zinc oxide or ammonium acetate, alkali fluotitanates, alkali fluozirconates and also known catalysts may be used as auxiliary aids in the gelation step if desired. If such auxiliary aids are used. They are usually added when the froth has reached the desired volume. The frothed mixture is poured into molds, spread on a flat tray or belt, or coated onto substrates. For the purpose of these specifications, the term "substrate" is defined as any material such as cloth, fabric, leather, wood, glass, or metal or any form of backing to which the frothed mixture will adhere when applied and after it is cured.

The curing step of this invention is an extension of the gelling procedure and proceeds by the further interaction of the reactive latex polymer and the coreactive material. The curing step in the previously known procedures for making latex foam required the use of added vulcanizing agents, together with the requisite supplementary agents, including catalyst or accelerators. In the process and products of this invention, such customary vulcanizing additives are not required, although they may be used as auxiliary agents if desired. Operable ranges of temperature of the curing step are from about 120° to 150° C. It has been found that the catalysts of this invention are particularly advantageous where lower temperature cures are desirable, especially with some of the more thermally sensitive substrates, such as acrylic fibers, polyesters, polypropylene, and the like, where faster cures are needed without too high a temperature. These catalysts are also advantageous for foams because the cellular structure of the foams inhibit heat transfer, causing the interior of the foam to reach curing temperatures slowly.

While not required for the practice of this invention, conventional vulcanizing agents, accelerators, ultra accelerators, zinc oxide, antioxidants, gelling agents, and the like as well as other known rubber compounding ingredients, such as plasticizers, mineral fillers, and carbon black, may be included as part of composition if desired.

The following examples are provided for illustrative purposes and may include particular features of the invention. However, the examples should not be construed as limiting the invention, many variations of which are possible without departing from the spirit or scope thereof.

EXAMPLE I

Preparation of the tetraammine zinc (II) nitrate

To a stainless steel reactor is added the following:

| | Parts |
|---|---|
| Water | 24 |
| Nitric acid, 40° Bé. | 43 |
| Zinc oxide | 17.6 |

The zinc oxide is added slowly to the nitric acid solution at a temperature below about 60° C. Anhydrous ammonia, 15.4 parts, is added, forming a thick paste. The paste may be dispersed by the addition of a surfactant, such as Tanol SN. As the ammonia is added to the mixture the paste gradually thins and at a pH greater than 9 forms a complete solution. Any insoluble impurities are filtered off.

The product so produced has the following analyses:

| | |
|---|---|
| Percent solids | 50±2 |
| Specific gravity | 1.3±0.1 |
| pH | 10±1 |
| Viscosity, centipoises | 5–10 |
| Percent zinc | 13.5±0.5 |

EXAMPLE II

Preparation of tetraammine zinc (II) chloride

To a suitable vessel containing 128.9 grams (1 mole) of 28% aqueous ammonia was added 136.3 grams (1 mole) of zinc chloride. A flocculent white precipitate formed with the evolution of heat. Additional ammonia solution was added with stirring until the precipitate redissolved. A total of 246.8 grams of aqueous ammonia was used. The resultant clear solution had a pH of 9.5, a specific gravity of 1.234, a solids content of 42.0% and a zinc content of 16.13%.

EXAMPLE III

Preparation of tetraamminezinc (II) sulfate

Following the procedure of Example II, 287.5 grams (1 mole) of zinc sulfate ($ZnSO_4 \cdot 7H_2O$) was added to 140 grams of concentrated aqueous ammonia. A clear solution was obtained with the total use of 157.9 grams of ammonia solution. The pH of the solution was 10.0, specific gravity 1.246, solids content 36.5% and zinc content 11.35%.

EXAMPLE IV

The following latex composition was prepared:

| | Parts |
|---|---|
| Carboxylated styrene-butadiene latex [1] | 190 |
| Tetrasodium pyrophosphate, 5% solution | 5 |
| Calcium carbonate | 100 |
| Melamine-formaldehyde resin, 80% solids [2] | 6.25 |
| Sodium polyacrylate thickener [3] | 5 |
| Water, sufficient to bring solids to 60%. | |

[1] Pliolite 440: Goodyear carboxylated latex, styrene: butadiene ratio=50:50; 52.6% solids.
[2] Aerotex M-3: Methylated trimethylol melamine.
[3] Alcogum 5950: Alco Oil & Chemical Corp.

The composition was divided in two and designated compositions A and B. To compostion A 2 grams of the catalyst of Example I was added prior to addition of the thickener. No catalyst was added to composition B. Thin films were drawn down on a glass plate using a doctor blade. No coagulum was observed in either film. After air drying, test samples, 0.25" x 3", were cut from the films and duplicate samples of each composition cured in a circulating air oven at 132° C. for 3, 5, 7 and 9 minutes. The length of each cured sample was precisely measured and the extent of linear swell in toluene was determined as an indication of degree of crosslinking. After 45 minutes all samples ceased to increase in length. The results set forth in Table 1 are expressed as percent increase in length over the original length.

TABLE 1

| Cure time, min. at 132° C. | A | B |
|---|---|---|
| 3 | 50.2 | 62.6 |
| 5 | 49.7 | 54.9 |
| 7 | 48.1 | 49.7 |
| 9 | 48.0 | 48.7 |

The data shows that the catalyzed composition A is essentially fully cured after 3 minutes, whereas in uncatalyzed compostion B, an equivalent state of cure is not reached until about 7 minutes.

EXAMPLE V

Example IV was repeated using, respectively 4.0, 6.0 and 12.0 gram additions of the catalyst of Example I. Linear swell in toluene was determined as in Example IV. In all cases cure was complete in 3 minutes.

EXAMPLE VI

In a manner similar to Example IV latex compositions were prepared containing tetraamminezinc (II) chloride and tetraammine zinc (II) sulfate. Films were cast and cured as described, with similar results.

What is claimed:

1. A carboxylated latex pre-vulcanizate composition comprising:
   (a) a carboxylated latex which is a copolymer of at least 2 polymerizable, ethylenically unsaturated monomers selected from the group consisting of butadiene, styrene and acrylonitrile and monomers copolymerizable with styrene wherein up to about 10 percent by weight of said monomers consists of monomers which have a pendant reactive group, selected from the group consisting of monoethylenically unsaturated mono- and dicarboxylic acids, acrylamide, an N-hydroxyalkylacrylamide or a primary hydroxyalkyl acrylate,
   (b) from about 1 to 100 percent, based on the weight of the copolymer in the latex, of at least one coreactive resin being selected from the group consisting of melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates and phenol formaldehyde condensates, and (c) from about 0.5 to 5 percent, based on the weight of the solids content of the latex and the resin together, of a tetraammine zinc (II) salt.

2. A composition according to claim 1 wherein the tetraammine zinc (II) salt is a member selected from the group consisting of tetraammine zinc (II) nitrate, tetraammine zinc (II) chloride and tetraammine zinc (II) sulfate.

3. A composition according to claim 1 wherein the coreactive resin is melamine-formaldehyde condensate.

4. A process of preparing a solid carboxylated latex vulcanizate comprising the steps of
(1) mixing:
  (a) a carboxylated latex which is a copolymer of at least 2 polymerizable, ethylenically unsaturated monomers selected from the group consisting of butadiene, styrene and acrylonitrile and monomers copolymerizable with styrene wherein up to about 10 percent by weight of said monomers consists of monomers which have a pendant reactive group, selected from the group consisting of monoethylenically unsaturated mono- and dicarboxylic acids, acrylamide, an N-hydroxyalkylacrylamide or a primary hydroxyalkyl acrylate,
  (b) from about 1 to 100 percent, based on the weight of the copolymer in the latex, of at least one coreactive resin being selected from the group consisting of melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates and phenol formaldehyde condensates, and
  (c) from about 0.5 to 5 percent, based on the weight of the solids content of the latex and the resin together, of a tetraamminezinc (II) salt, and
(2) curing and drying the resulting composition.

5. A solid foam prepared from a blend of
(a) a carboxylated latex which is a copolymer of at least 2 polymerizable, ethylenically unsaturated monomers selected from the group consisting of butadiene, styrene and acrylonitrile and monomers copolymerizable with styrene wherein up to about 10 percent by weight of said monomers consists of monomers which have a pendant reactive group, selected from the group consisting of monoethylenically unsaturated mono- and dicarboxylic acids, acrylamide, an N-hydroxyalkylacrylamide or a primary hydroxyalkyl acrylate,
(b) from about 1 to 100 percent, based on the weight of the copolymer in the latex, of at least one coreactive resin being selected from the group consisting of melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates and phenol formaldehyde condensates, and
(c) from about 0.5 to 5 percent, based on the weight of the solids content of the latex and the resin together, of tetraamminezinc (II) salt.

6. A solid foam according to claim 5 wherein the blend comprises a blowing agent.

7. A process for preparing a solid foam comprising the steps of
(1) mixing
  (a) a carboxylated latex which is a copolymer of at least 2 polymerizable, ethylenically unsaturated monomers selected from the group consisting of butadiene, styrene and acrylonitrile and monomers copolymerizable with styrene wherein up to about 10 percent by weight of said monomers consists of monomers which have a pendant reactive group, selected from the group consisting of monoethylenically unsaturated mono- and dicarboxylic acids, acrylamide, an N-hydroxyalkylacrylamide or a primary hydroxyalkyl acrylate,
  (b) from about 1 to 100 percent, based on the weight of the copolymer in the latex, of at least one coreactive resin being selected from the group consisting of melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates and phenol formaldehyde condensates, and
  (c) from about 0.5 to 5 percent, based on the weight of the solids content of the latex and the resin together, of a tetraamminezinc (II) salt,
(2) foaming the resulting mixture,
(3) gelling the resulting foam, and
(4) curing and drying the gelled foam.

8. A composite article composed of a substrate with an adherent coating of a solid carboxylated latex vulcanizate prepared from a blend of
(a) a carboxylated latex which is a copolymer of at least 2 polymerizable, ethylenically unsaturated monomers selected from the group consisting of butadiene, styrene and acrylonitrile and monomers copolymerizable with styrene wherein up to about 10 percent by weight of said monomers consists of monomers which have a pendant reactive group, selected from the group consisting of monoethylenically unsaturated mono- and dicarboxylic acids, acrylamide, an N-hydroxyalkylacrylamide or a primary hydroxyalkyl acrylate,
(b) from about 1 to 100 percent, based on the weight of the copolymer in the latex, of at least one coreactive resin being selected from the group consisting of melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates and phenol formaldehyde condensates, and
(c) from about 0.5 to 5 percent, based on the weight of the solids content of the latex and the resin together, of tetraamminezinc (II) salt.

9. A composite article according to claim 8 wherein the carboxylated latex vulcanizate is a solid foam.

References Cited
UNITED STATES PATENTS

| | | | |
|---|---|---|---|
| 3,215,647 | 11/1965 | Dunn | 260—2.5 L |
| 3,538,025 | 11/1970 | Roberts | 260—2.5 L |

MURRAY TILLMAN, Primary Examiner

M. FOELAK, Assistant Examiner

U.S. Cl. X.R.

260—2.5 F, 29.3, 29.4 UA, 844, 845, 846, 851, 852, 855, 856